June 30, 1953    H. WHITESELL    2,643,549
CONTACT WHEEL AND THE LIKE
Filed Sept. 23, 1952
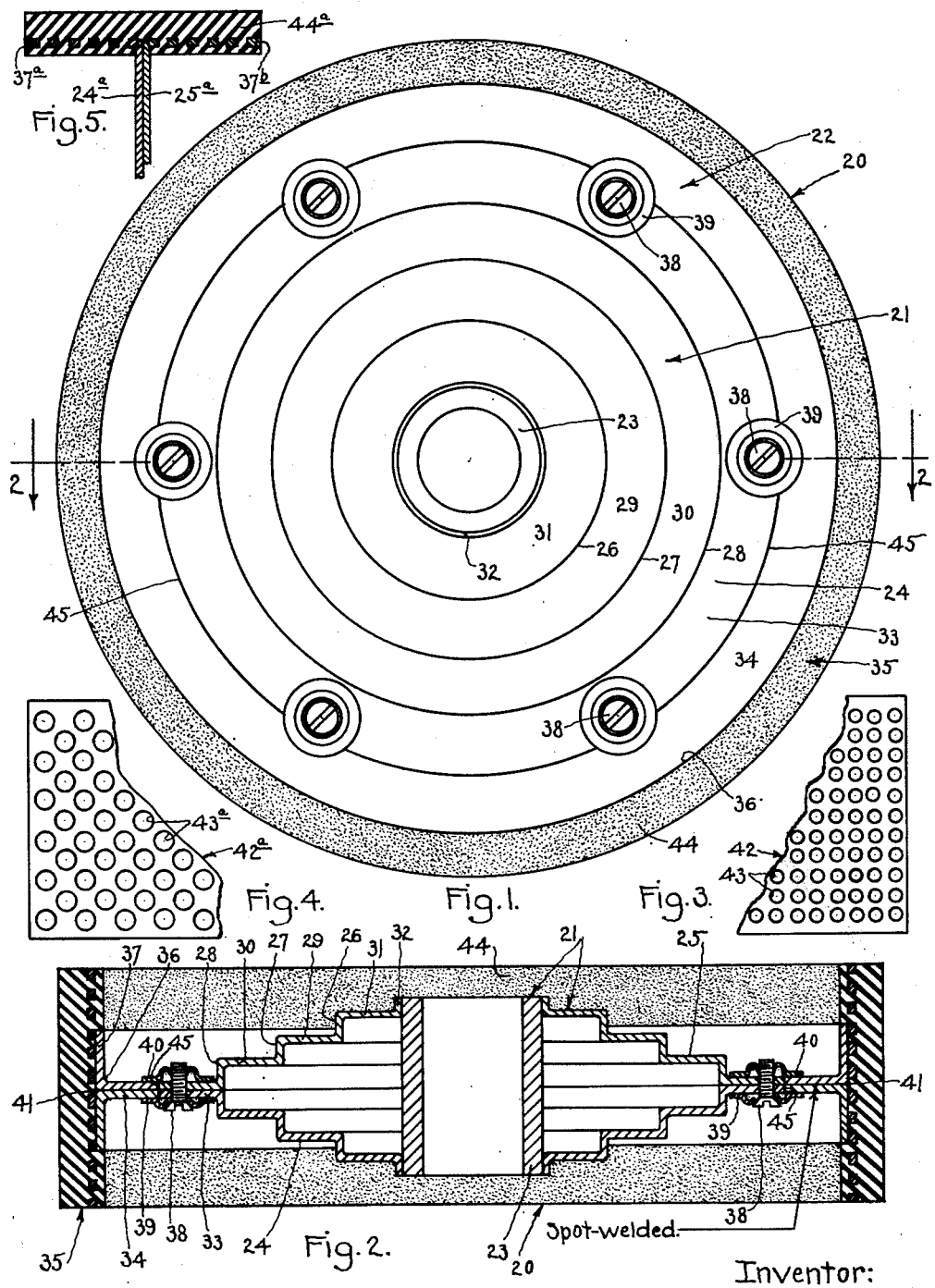
Inventor:
Harry Whitesell, Patented June 30, 1953

2,643,549

UNITED STATES PATENT OFFICE 2,643,549

CONTACT WHEEL AND THE LIKE

Harry Whitesell, Chicago, Ill.

Application September 23, 1952, Serial No. 311,129

14 Claims. (Cl. 74—230.7)

This invention has to do with improvements in contact wheels, and the like. These contact wheels are intended especially for use in connection with belt or tape grinders or polishers, but the wheel construction herein disclosed may also be used for many other purposes, and therefore I do not intend to limit myself to use of such wheels in connection with grinding and/or polishing operations, except as I may limit myself in the claims to follow. However, I shall disclose particularly the use of said wheels in connection with grinding and/or polishing operations in order that benefits and objects of the improvements herein disclosed may be better understood.

The tape or belt grinder includes a continuous or closed belt which is passed over several pulleys or wheels, one or more of which is or are held in adjusted position to retain the belt under desired tension. One of the pulleys or wheels is suitably power driven so as to drive the belt at such surface speed as may be desired according to the work to be performed by the belt. This surface speed is generally high, being of the order of 10,000 to 12,000 ft./min., but other speeds are used, both higher and lower than just mentioned. The exposed belt surface is suitably coated with abrasive or polishing agent, of fineness and composition dependent on the work to be done. This agent is suitably adhered to the belt surface, as by suitable cementing agent. The width of the belt will depend also on the work to be performed, the size of objects to be treated, etc., an example of such width being 4 to 4½ inches or thereabouts. The belt is of sufficient flexibility to faithfully retain its surface contact with the wheels over which it travels, when subjected to the desired belt tension; and the tensile strength of the belt must be sufficient to allow for belt tensions per inch of width sufficient to ensure proper operation with sufficient factor of safety.

One of the wheels over which the belt travels is a driver, the others being idlers. Generally the work to be treated is pressed and held against the abrasive belt surface at the location of one of the idler wheels. Such wheel is made of diameter such that good surface contact may be effected against the belt surface; and such diameter may be of the order of 6 or 8 inches to 14 or 16 inches, more or less. Usually such wheels are made of standard diameters, usually 6, 8, 10, 12, 14 or 16 inches. A familiar diameter is 12 or 14 inches. With such a wheel diameter a considerable surface of the treated work may be abrasively treated with rather slight rocking movement of the work, since the circumferential size of the wheel varies directly with the wheel diameter. Such wheel against which the work is pressed into contact with the abrading belt is known as a "contact wheel." This wheel is provided with a flat surface as distinguished from being "crowned," the wheel surface being truly cylindrical.

A prime object of the present invention is to provide a construction of "contact" wheel which may be produced in quantity production with a high degree of accuracy, and at low cost, and by simple manufacturing operations. In this connection, it is an object to provide a wheel design which is such that the wheel may be readily manufactured from sheet metal, and according to conventional sheet metal treating operations. In this connection it is a further object to so design the wheel that it may be produced from a minimum number of different sheet metal elements and by use of a minimum number of dies. In this latter connection it is a further object to make provision for production of wheels of several diameters from common dies, the steps in the side faces of the wheel being so related to the wheel sizes that this result may be readily secured.

It is a further object to provide a wheel construction of high stiffness, so that it will retain its true running quality when running at high speed, and when subjected to the forces developed by the belt tension, and by the pressure of the work against the abrasive surface. In connection with the foregoing, I have formed the wheel with side plates or faces which are provided with circular steps or shoulders, so that when the said plates are assembled together into the wheel said wheel has a progressively graded axial dimension, measured radially of the wheel. That is to say, the axial dimension of the wheel is a maximum at its hub, and progresses by regular steps to narrower and narrower dimensions as the periphery of the wheel is approached; and the periphery of the wheel is then formed as a cylindrical section of desired width according to the size of the wheel. This shouldered form of the side plates ensures great stiffness in the body of the wheel; and the increase in number of such shoulders with wheel size ensures that large wheels shall be proportionately as stiff or even stiffer than wheels of smaller diameters.

Another feature and object of the invention relates to the provision of a working cylindrical surface formed of rubber or plastic material, of specifications which will provide good holding quality of the rapidly travelling belt on the wheel surface, and at the same time will provide a slightly non-hard or non-rigid surface on which the belt travels. By the provision of such a surface better abrading action is secured when the work is held against the abrading surface of the belt.

A further feature and object of the invention relates to the provision of a peripheral portion for the wheel, which peripheral portion is readily attached to or removed from the body of the wheel by simple operations. This peripheral portion of the wheel includes said rubber or plastic surface which is suitably moulded and vulcanized or heat treated in place, and thus comprises in effect an integral portion of such peripheral portion of the wheel. In case of wear or damage to such peripheral portion, or desire to substitute another peripheral portion, such change may be readily effected by simple operations, not requiring the use of special tools. Such peripheral portion is formed as a self-contained element or unit which is attachable to or detachable from the body of the wheel when desired.

Other objects and uses of the invention will appear from a detailed description of the same, which consists in the features of construction and combinations of parts hereinafter described and claimed.

In the drawing:

Figure 1 shows a face view of a typical contact wheel embodying the features of my present invention, being shown on substantially one-half size;

Figure 2 shows a transverse section taken on the line 2—2 of Figure 1, looking in the direction of the arrows;

Figure 3 shows a fragmentary development of a portion of one form of flange sheet used in the production of the flange portion of the peripheral section, said sheet being provided with rectangularly spaced perforations through which the rubber or plastic is vulcanized or heat treated;

Figure 4 shows a fragmentary development of a portion of another form of flange sheet used in the production of the flange portion of the peripheral section, said sheet being provided with offset or staggered perforations through which the rubber or plastic is vulcanized or heat treated; and Figure 5 shows a fragmentary section through a modified form of wheel, showing the rim portion thereof; this modification comprising forming of the body plates themselves with peripheral flange portions, comprising portions of the wheel flange, and forming the rubber like or plastic surface directly on said peripheral flange portions, said peripheral flange portions being suitably foraminated to ensure good holding quality of the rubber like or plastic surface material thereto.

In the drawing the wheel 20 includes the hub and body portion, 21, and the rim portion 22. The body portion is formed of the tubular hub element 23 on which there are mounted the two identical but reversed circular plates 24 and 25. Each of these is circular in form, and is formed with the circular progressive shoulders 26, 27 and 28 joined by the radial flat portions 29 and 30. The flat portion 31 extends from the innermost shoulder 26 to the hub element 23, and it is provided with the short neck portion 32 reaching outwardly and providing a good mounting for the entire element on the proximate end of the hub element. The outer flat portion 33 extends outwardly from the shoulder 28 a distance to provide a flat surface of circular form. The two plates 24 and 25, and the length of the hub, 23, are such that when said two elements or plates 24 and 25 are set together with their outer flat portions 33 in facial engagement with each other, the two neck portions 32 will be just accommodated on the end portions of the hub, as shown in Figure 2. Said neck portions may be made of size to set onto the hub with a press fit; and if desired, they may be welded to the ends of the hub. Also, if desired the peripheral portions of the flat circular portions 33 may be welded together to increase the rigidity of the structure.

The elements thus far disclosed provide a circular sheet metal disk including a central hub, and with the outer circular peripheral portion of said disk comprising a double thickness sheet metal annular element; and said structure also being provided with a series of circular outwardly facing shoulders of progressively increasing diameters, and with the peripheral portion of said element comprising a double thickness annulus having its two thicknesses in facial contact with each other (and, if desired, welded together either at the outer circular edge, or by spot welding). It is thus seen that this element 21 is of generally conical form, comprising generally two facing cones, but each of these cones comprising a series of annuli of increasing diameters, and joined by cylindrical shouldered portions which face outwardly in radial fashion. This body element is therefore self-contained, and very sturdy and stiff, and is light since it comprises a well designed sheet metal element of which the sheets may be of relatively thin gage.

The rim portion 22 comprises a radial annulus having its internal diameter the same as the external diameter of the element 21, together with a cylindrical peripheral flange portion. These elements comprise the annulus 34 and the cylindrical flange portion 35. The annulus comprises the two ring shaped angle sections 36 whose outer arms 37 comprise portions of the cylindrical portion 35. The inner diameter of this annulus is substantially the same as the external diameter of the element 21, and the thicknesses of the radial or annulus arms of the angles are the same as the thicknesses of the plates comprising the element 21. Thus the two radial or annulus arms brought face to face produce an annulus of the same thickness as the flat portion 33 of the element 21. The outer peripheral portion of the flat portion 33 is provided with a series of through openings for accommodation of the tie bolts 38 which are conveniently shown as comprising tap screws having conical heads. A washer 39 is set against the front or screw head face of the flat portion 33 at the location of each through opening, and a companion washer 40 is set against the back face of the flat portion 33 at each such through opening location. Each tap screw is then set through its washer 39, through the through opening, and threaded into the corresponding washer 40. Preferably these washers are formed as shown in section in Figure 2, the washer 39 thus being provided with a countersink into which sets the screw head, and the washer 40 thus being provided with a threaded opening presenting ample threads to ensure good holding quality with the screw. Both of the washers are of sufficient diameter to considerably overlap the faces of the radial portions of the angles 36 which provide the annulus of the element 22. Thus said element 22 is effectively locked to the element 21 by the said washers, and a very strong and stiff structure is produced.

It is now evident that when assembling the two elements 21 and 22 together, they may be set into concentricity and radial alignment, and they may then be locked together by the use of the tap screws and washers, properly assembled together. Also, that whenever it is desired to replace the element 22 either for substitution of another such element, or for repair or other purpose, it is only necessary to remove the tap screws and washers and effect the desired substitution. Thus, the same internal element 21 may be used with one or several of the outer elements 22 as desired.

Conveniently the two annular angles are secured together by spot welding their radial arms together as shown in Figure 2, such spot welds being suitably located at points around the radial elements. If desired, these two angle elements may also be welded together at their external angles, as shown at 41 in Figure 2. Thus, said annular or ring shaped element is secured into a stiff self-contained element.

A cylindrical or ring shaped flange element, 42, is set onto the cylindrical or flange arms of the element 22. This element 42 comprises a sheet metal element, brought into ring form and having its proximate ends welded together to provide a continuous ring; and this element is of size to set nicely over the said cylindrical or flange arms aforesaid. Then this element 42 may be spot-welded to said arms in order to produce a very stiff and rigid structure. The width of this element 42 is substantially the same as the desired width of the wheel flange to be produced.

Preferably this element 42 is provided with numerous foraminations 43, in the form of a grid. Suitable rubber or plastic material 44 is formed over the outer surface of this element 42, to produce a coating or layer which comprises the working surface of the wheel, and on which the abrasive belt travels. The thickness of this layer may be such as desired, being shown as substantially one-half inch in the drawings. Preferably this layer is carried through the foraminations as shown in Figure 2. Where these foraminations align with the outer surface of the arms of the angles 36 such rubber or other material will then come into engagement with such outer arm surfaces. Conveniently said rubber or plastic coating is carried over the inwardly facing surfaces of the element 42, as shown in Figure 2; and at such locations such material will extend through the corresponding foraminations to thus join together the material at the inner and outer faces of the element 42.

This coating of rubber or plastic material is formed onto the element 22 when said element is removed from or not in place on the element 21. Under these conditions such material may be either vulcanized in the case of rubber like materials, or otherwise heat treated, in the case of plastic materials, of which there is a wide variety from which to select. In any case, however, it will now be evident that such coating material is effectively joined or attached to the element 22 by heat treatment, and also that such coating material will effectively extend through the numerous foraminations of the element 42. Such material which extends through foraminations in register with the external surfaces of the angles 36 will be attached to said surfaces by such heat treatment; such material which extends through other foraminations will effectively join together the said material lying at the outer and inner surfaces of the element 42. Thus, said coating material will be effectively held at all points against high centrifugal forces developed during the fast running of the wheel in service.

If desired the outer surface of the coating material may be accurately finished into true cylindrical form, as by surface grinding or otherwise after the heat treatment has been completed.

In Figures 3 and 4 I have shown two arrangements of the foraminations of the element 42. In Figure 3 said foraminations are produced in square placement formation; in Figure 4 said foraminations are shown as breaking joints in regular succession, that is, they are staggered with respect to each other.

The contact wheel rotates very rapidly when such linear velocities as 12,000 ft./min. belt travel are used. Thus, with a wheel diameter of 14 inches the wheel speed will be approximately 3300 r. p. m. With such speeds it is important that the wheel be dynamically balanced. Such balance can be secured in any convenient manner, such as by slight reduction of the material of the wheel by grinding at proper locations.

A convenient manufacturing operation for the formation of the sheet metal parts is as follows:

Each of the plates 24 and 25 may be formed from a blank of size sufficient to also include the adjacent angle element of the portion 22. Such forming would include the formation of the arm portion 37 of the corresponding angle as a peripheral flange extending at right angles to the body of the plate, that is, in axial direction. After forming each plate, including formation of such peripheral flange, and also the several shouldered portions 26, 27 and 28, and the hub flange portion 32, such plate may be subjected to a cutting operation on a circular line at the radius of the line of contact of the two portions 21 and 22 (being the circular line 45). This will sever the two plate portions from each other at the correct line of sever. By this method of manufacture all of the metal forming operations may be produced at one time, with great saving in cost of manufacture, reduction of number of die sets needed, saving of time, and other benefits.

In Figure 5 I have shown a modified construction, this figure showing a detail or fragmentary portion of the rim or peripheral portion of the wheel. In this case the two body plates are designated as 24$^a$ and 25$^a$, respectively. They are provided with the angle or rim portions 37$^a$ and 37$^b$, which, in this modified construction, extend outwardly or axially the full width of the wheel flange. These portions 37$^a$ and 37$^b$ are provided with numerous foraminations; and the rubber like or plastic surfacing 44$^a$ is provided over said portions 37$^a$ and 37$^b$, to thus provide the desired finish for the wheel's working surface.

I claim:

1. A wheel comprising in combination a tubular hub member, a body member comprising a pair of circular sheet metal body elements of generally conical form and of the same external diameter and having central openings of size to fit on to the hub member, each body element having an annular peripheral flat portion lying in a plane normal to the conical axis of such element and terminating in a circular peripheral edge, said body elements being mounted on the hub member with their concave surfaces facing each other and with their flat annular peripheral portions in facial contact with each other and with their circular peripheral edges in registry with each other and defining a circular periphery of the body member of axial dimension equal to the combined thicknesses of the two body elements, together with an annular peripheral member removably mounted on said body member and comprising a pair of circular angle section elements of the same size and each having one leg of its angle lying in a plane normal to the central axis of such element and extending radially inwardly at the concave face of such element, and the other leg of each of said circular angle elements lying in a cylinder coaxial with the central axis of such element, said circular elements being set with their radial leg portions in facial contact with each other and with their cylindrical leg portions in cylindrical alignment with each other, means to secure both of said circular angle section elements together in such set relationship, the inner edges of the radial leg portions defining a central opening of the same size as the periphery of the body member, the combined thicknesses of the radial legs of both of the leg portions being substantially the same as the combined thicknesses of the peripheral portions of the two body elements, a cylindrical foraminated element mounted on the cylindrical leg portions of the two angle section elements, suitable formable material coating the outwardly facing surface of said cylindrical foraminated element and extending through the foraminations thereof, and means to removably secure the said annular peripheral member to the said body member with the radial leg portions of the angle section elements in planar alignment with the annular peripheral flat portions of the body member.

2. A wheel as defined in claim 1 wherein both of the circular sheet metal body elements of generally conical form are of substantially identical form and size.

3. A wheel as defined in claim 2 wherein each of said body elements comprises a sheet metal blank formed to include a series of circular cylindrical sections of progressively larger sizes together with intermediate flat planar annular sections joining said cylindrical sections together, the lines of joinder of the planar annular sections with the circular cylindrical sections lying in conical surfaces defining the generally conical forms of the body elements.

4. A wheel as defined in claim 3 wherein said circular cylindrical sections are of progressively larger sizes by substantially equal increments of size.

5. A wheel as defined in claim 1 wherein the means to removably secure the annular peripheral member to the body member comprises a plurality of tension elements extending through the flat annular peripheral portions of the body elements, together with elements in connection with said tension elements and extending radially outwardly beyond the body elements and overlying the inner edges of the radial leg portions of the annular peripheral member.

6. A wheel as defined in claim 5 wherein said tension elements comprise screws, and wherein said elements which overlie the inner edges of the radial leg portions of the annular peripheral member comprise washers carried by said screws.

7. A wheel as defined in claim 1 wherein the formable material coating the cylindrical foraminated element comprises rubber like material.

8. A wheel as defined in claim 1 wherein the formable material coating the cylindrical foraminated element comprises plastic material.

9. A wheel as defined in claim 1 wherein the foraminations of the cylindrical foraminated element are located in lines parallel to the edges of said element and wherein the foraminations of successive lines are in axial registry with each other.

10. A wheel as defined in claim 1 wherein the foraminations of the cylindrical foraminated element are located in lines parallel to the edges of said element and wherein the foraminations of successive lines break joints with each other.

11. A wheel as defined in claim 1 wherein the means to secure the circular angle section elements together comprises welding.

12. A wheel comprising in combination a tubular hub member, a body member comprising a pair of circular sheet metal body elements of generally conical form and of the same external diameter and having central openings of size to fit on to the hub member, each body element having an annular peripheral flat portion lying in a plane normal to the conical axis of such element, said body elements being mounted on the hub member with their concave surfaces facing each other and with their flat annular portions in facial contact with each other, and a circular cylindrical element peripheral portion in connection with each body element and having a cylindrical surface coaxial with the central axis of such element, the cylindrical surfaces of both of the peripheral portions of the body elements being of the same size, the circular cylindrical elements of both body elements together comprising a cylindrical peripheral wheel portion coaxial with the axis of the hub member, there being numerous foraminations in said cylindrical peripheral wheel portion, together with formable material on the outwardly facing surface of said cylindrical peripheral wheel portion and extending through said foraminations.

13. A wheel as defined in claim 12, wherein the flat portion of each body element extends inwardly of such body element from a circular line of joinder with the cylindrical element peripheral portion of such body element to a circular line of joinder with the generally conical form portion of such body element.

14. A wheel comprising in combination a tubular hub member, a body member comprising a pair of circular sheet metal body elements of generally conical form and of the same external diameter and having central openings of size to fit on to the hub member, each body element having an annular peripheral flat portion lying in a plane normal to the conical axis of such element, said body elements being mounted on the hub member with their concave surfaces facing each other and with their flat annular portions in facial contact with each other, and a circular cylindrical element peripheral portion in connection with each body element and having a cylindrical surface coaxial with the central axis of such element, the cylindrical surfaces of both of the peripheral portions of the body elements being of the same size, the circular cylindrical elements of both body elements together comprising a cylindrical peripheral wheel portion coaxial with the axis of the hub member, together with formable material on the outwardly facing surface of such cylindrical peripheral wheel portion.

HARRY WHITESELL.

References Cited in the file of this patent

UNITED STATES PATENTS

| Number | Name | Date |
|---|---|---|
| 665,949 | Albert | Jan. 15, 1901 |
| 1,748,100 | Avery | Feb. 25, 1930 |
| 1,811,916 | Carter | June 30, 1931 |
| 1,980,479 | Gannett | Nov. 13, 1934 |